United States Patent
Mustapha et al.

(10) Patent No.: US 10,895,131 B2
(45) Date of Patent: Jan. 19, 2021

(54) PROBABILISTIC AREA OF INTEREST IDENTIFICATION FOR WELL PLACEMENT PLANNING UNDER UNCERTAINTY

(71) Applicant: Schlumberger Technology Corporation, Sugar Land, TX (US)

(72) Inventors: Hussein Mustapha, Didcot (GB); Daniel de Brito Dias, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 292 days.

(21) Appl. No.: 15/908,818

(22) Filed: Mar. 1, 2018

(65) Prior Publication Data
US 2019/0271211 A1 Sep. 5, 2019

(51) Int. Cl.
| | |
|---|---|
| *E21B 41/00* | (2006.01) |
| *G01V 99/00* | (2009.01) |
| *G06F 17/11* | (2006.01) |
| *G06F 17/18* | (2006.01) |
| *E21B 49/02* | (2006.01) |
| *E21B 49/00* | (2006.01) |
| *E21B 47/06* | (2012.01) |
| *E21B 47/12* | (2012.01) |
| *G01V 1/30* | (2006.01) |
| *G06F 111/10* | (2020.01) |

(52) U.S. Cl.
CPC ........ *E21B 41/0092* (2013.01); *G01V 99/005* (2013.01); *G06F 17/11* (2013.01); *G06F 17/18* (2013.01); *E21B 47/06* (2013.01); *E21B 47/12* (2013.01); *E21B 49/00* (2013.01); *E21B 49/02* (2013.01); *G01V 1/302* (2013.01); *G06F 2111/10* (2020.01)

(58) Field of Classification Search
CPC ...... E21B 41/0092; E21B 47/06; E21B 47/12; E21B 49/00; E21B 49/02; G01V 99/005; G01V 1/302; G06F 17/11; G06F 17/18; G06F 2111/10; G06F 17/30241; G06Q 30/0283

See application file for complete search history.

(56) References Cited

U.S. PATENT DOCUMENTS

2013/0110483 A1* 5/2013 Chugunov ........... G01V 99/005 703/10
2016/0003008 A1* 1/2016 Uribe ...................... E21B 7/04 175/50

(Continued)

OTHER PUBLICATIONS

International Search Report and Written Opinion for the equivalent International patent application PCT/US2019/019950 dated Jun. 13, 2019.

*Primary Examiner* — Suzanne Lo
(74) *Attorney, Agent, or Firm* — Colin L. Wier (57) ABSTRACT

A method, apparatus, and program product utilize a probabilistic approach to identify areas of interest from multiple realizations of a reservoir model to drive well placement planning under uncertainty. A combined probability map may be generated from opportunity maps generated for multiple reservoir model realizations such that a probability value in various entries of the probability map represents a probability of opportunity values stored in corresponding entries of the opportunity maps meeting an opportunity criterion. One or more areas of interest may then be identified from the probability map.

19 Claims, 6 Drawing Sheets

(56) References Cited

U.S. PATENT DOCUMENTS

| | | |
|---|---|---|
| 2016/0018562 A1 | 1/2016 | Bratvedt et al. |
| 2016/0047943 A1* | 2/2016 | Maucec .................. G01V 1/30 |
| | | 703/2 |
| 2016/0102530 A1 | 4/2016 | Baranov et al. |
| 2016/0145991 A1 | 5/2016 | Yarus et al. |
| 2017/0011149 A1 | 1/2017 | Liu et al. |
| 2017/0108617 A1 | 4/2017 | Fei et al. |
| 2020/0124753 A1* | 4/2020 | Halsey .................. G06F 30/20 |

* cited by examiner

PROBABILISTIC AREA OF INTEREST IDENTIFICATION FOR WELL PLACEMENT PLANNING UNDER UNCERTAINTY

BACKGROUND

Well placement planning is used in a number of industries to plan out the placement of prospective wells. In the oil & gas industry, for example, well placement planning is used to select placements and trajectories for proposed wells into a subsurface reservoir to reach specific locations in the reservoir that are believed to contain recoverable hydrocarbons. Well placement planning may be used to produce a well placement plan (WPP) that includes one or more wells, as well as additional information such as well trajectories, well completions, drilling schedules, etc. Generally, a reservoir simulator is used in connection with well placement planning so that reservoir simulation may be performed to determine the potential performance of any well placement plan.

Well placement planning may generally be considered to be an optimization problem as well as a problem that is in part driven by uncertainty. Generally, well placement planning has been performed in a predominantly manual process in which a user selects target and well locations, performs a reservoir simulation forecast, and then calculates predicted performance based on the forecast oil or gas recovered and the cost of the wells. The user generally may repeat the process a number of times, but modify the number and location of the wells and completions. The modifications may include, for example, different water flooding strategies, well spacing, well types, platform locations, etc.

Moreover, it will be appreciated that at least some of the data used to drive the planning has some degree of uncertainty. For example, data collected from well logging is used in many processes to attempt predict the subsurface features and/or properties in a reservoir, but the collected data is highly localized to the region in the immediate vicinity of the well from which the data is collected. The collected data may be used to predict features and/or properties in other regions of the reservoir; however, the further away from the wells from which data is collected, the greater the uncertainty that exists in the predictions.

Well placement planning has been found to be a very time-consuming process from both the user's perspective and a computational perspective. Well placement planning has also been found to be a relatively inefficient process because it may be difficult for a user to objectively explore the complete solution space as well as to appropriately account for the inherent uncertainty in the models utilized in the planning process.

A need therefore exists in the art for a more effective and computationally efficient approach to well placement planning.

SUMMARY

The embodiments disclosed herein provide a method, apparatus, and program product that utilize a probabilistic approach to identify areas of interest from multiple realizations of a reservoir model to drive well placement planning under uncertainty. In some embodiments, a combined probability map may be generated from opportunity maps generated for multiple reservoir model realizations such that a probability value in various entries of the probability map represents a probability of opportunity values stored in corresponding entries of the opportunity maps meeting an opportunity criterion. One or more areas of interest may then be identified from the probability map.

Therefore, consistent with one aspect of the invention, a method of well placement planning may include receiving a set of reservoir model realizations covering a subsurface volume, each reservoir model realization including a plurality of cells representing respective subvolumes of the subsurface volume, each cell in each reservoir model realizations including one or more properties representative of the respective subvolume of the subsurface volume, generating, for each of the set of reservoir model realizations, a corresponding opportunity map including a plurality of entries corresponding to respective cells in the corresponding reservoir model realization, including, for each entry in the corresponding opportunity map, calculating and storing an opportunity value representative of recovery potential based upon at least a portion of the one or more properties in the respective cell in the corresponding reservoir model realization, generating a combined probability map from the opportunity maps corresponding to the set of reservoir models, the combined probability map including a plurality of entries corresponding to respective entries in each of the opportunity maps, including, for each entry in the combined probability map, calculating and storing a probability value representative of a probability of the opportunity values stored in the respective entries in the opportunity maps meeting an opportunity criterion, accessing the combined probability map to identify one or more areas of interest in the subsurface volume based upon the probability values stored in the entries of the combined probability map, and generating a well placement plan that places at least one well in the identified one or more areas of interest.

Some embodiments may also include, prior to generating the corresponding opportunity maps, screening the set of reservoir model realizations to reduce redundancies in the set of reservoir model realizations. Also, in some embodiments, screening the set of reservoir model realizations includes executing image analysis on the set of reservoir model realizations to identify one or more groups of redundant reservoir model realizations. Further, in some embodiments, screening the set of reservoir model realizations further includes, after executing image analysis selecting a representative reservoir model realization for each group of redundant reservoir model realizations, and removing from the set of reservoir model realizations each non-selected reservoir model realization in each group of redundant reservoir model realizations.

In some embodiments, executing image analysis is performed using a neural network. In addition, in some embodiments, executing image analysis includes performing physics-independent pattern recognition on the set of reservoir model realizations. In some embodiments, executing image analysis includes performing physics-based pattern recognition on the set of reservoir model realizations.

Some embodiments may also include, prior to generating the corresponding opportunity maps, calibrating each of the plurality of reservoir model realizations. In some embodiments, calibrating each of the plurality of reservoir model realizations includes history matching each of the plurality of reservoir model realizations. In addition, in some embodiments, the history matching includes ensemble-based history matching. Moreover, in some embodiments, the history matching includes applying a Kalman filter.

In some embodiments, calculating each opportunity value includes calculating a simulation opportunity from at least flow capacity, mobile oil saturation and oil pore volume determined for the respective cell in the corresponding reservoir model realization, and calculating a reservoir opportunity from at least reservoir quality, pressure gradient and oil pore volume determined for the respective cell in the corresponding reservoir model realization.

Moreover, in some embodiments, calculating each opportunity value is performed using a formula $OV=0.315483*NTG*H*(S_{OIL}-S_{OR})*(k*\phi)^{0.5}*(P-P_{initial})^{(1/3)}$, where OV is the opportunity value, NTG is net to gross, H is cell height, $S_{OIL}$ is oil phase saturation, $S_{OR}$ is critical or residual oil saturation, k is permeability, $\phi$ is porosity, P is actual reservoir pressure and Pinitial is initial reservoir pressure.

In some embodiments, the opportunity criterion includes a threshold, and the probability value is representative of a probability of the opportunity values stored in the respective entries in the opportunity maps meeting the threshold. Some embodiments may also include generating a plurality of combined probability maps using different thresholds, and accessing the plurality of combined probability maps to identify one or more areas of interest in the subsurface volume based upon the probability values stored in the entries of the combined probability maps.

In addition, in some embodiments, accessing the combined probability map to identify one or more areas of interest in the subsurface volume based upon the probability values stored in the entries of the combined probability map includes combining entries in the combined probability map based upon potential well trajectories. In some embodiments, combining entries in the combined probability map based upon potential well trajectories includes combining entries in vertical columns of the combined probability map. Moreover, in some embodiments, generating the well placement plan includes executing an iterative well placement optimizer restricted to the identified one or more areas of interest to accelerate convergence of the iterative well placement optimizer. Also, in some embodiments, generating the well placement plan includes executing numerical simulation on the at least one well in the identified one or more areas of interest, and evaluating performance and risk of the at least one well based upon the numerical simulation.

Some embodiments may also include an apparatus including at least one processing unit and program code configured upon execution by the at least one processing unit to perform well placement planning by performing any of the aforementioned operations, as well as a program product including a computer readable medium and program code stored on the computer readable medium and configured upon execution by at least one processing unit to perform well placement planning by performing any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

The herein-described embodiments provide a method, apparatus, and program product that utilize a probabilistic approach to identify areas of interest from multiple realizations of a reservoir model to drive well placement planning under uncertainty. In some embodiments, a combined probability map may be generated from opportunity maps generated for multiple reservoir model realizations such that a probability value in various entries of the probability map represents a probability of opportunity values stored in corresponding entries of the opportunity maps meeting an opportunity criterion. One or more areas of interest may then be identified from the probability map.

An opportunity map, in this regard, may refer to practically any type of data structure that stores opportunity values corresponding to one or more subvolumes of a reservoir represented by a reservoir model realization. The opportunity values may be based on various metrics related to recovery potential, and may be calculated from various types of reservoir properties that may be maintained in a reservoir model realization.

A probability map may similarly refer to practically any type of data structure that probabilistically combines the opportunity values of multiple opportunity maps. In some embodiments, a probability map may store probability values that represent the probability of a set of opportunity values meeting some opportunity criterion, e.g., a threshold. As will become more apparent below, higher probability values may generally relate to higher recovery potentials and/or lower uncertainty across multiple opportunity maps and thus across multiple reservoir model realizations, and thus higher probability values may be indicative of potential areas of interest in a reservoir to evaluate for well placement planning purposes.

Other variations and modifications will be apparent to one of ordinary skill in the art.

Hardware and Software Environment

Figure 1:
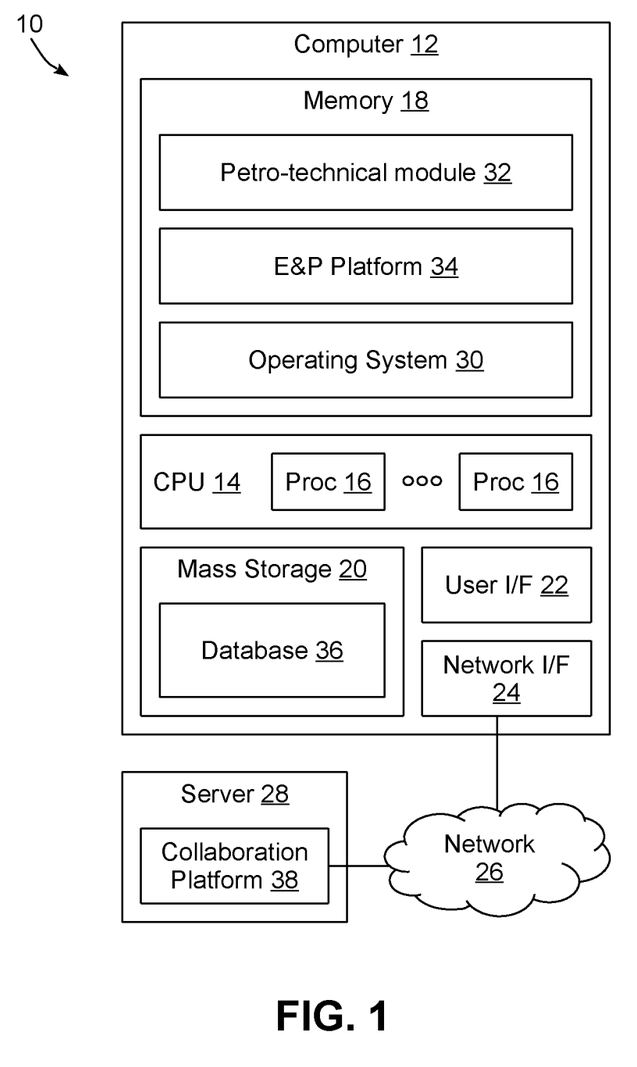
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
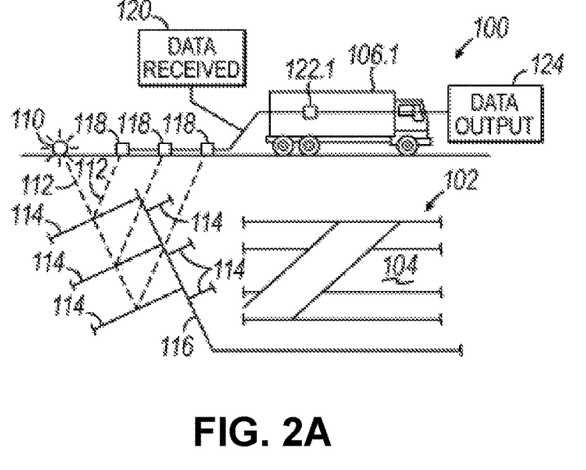
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
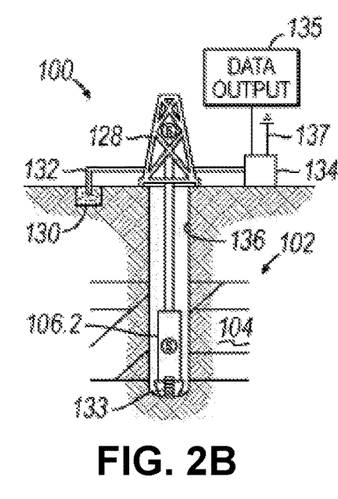

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
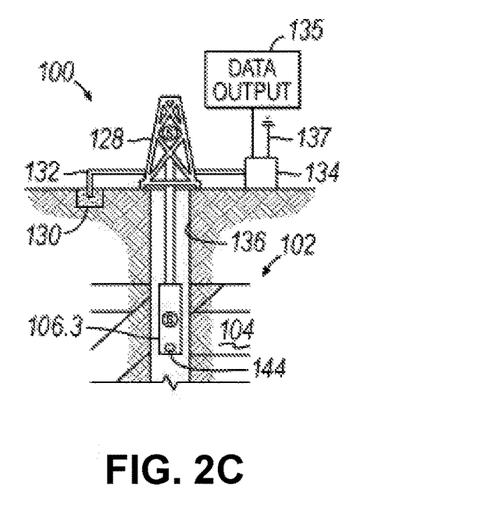

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
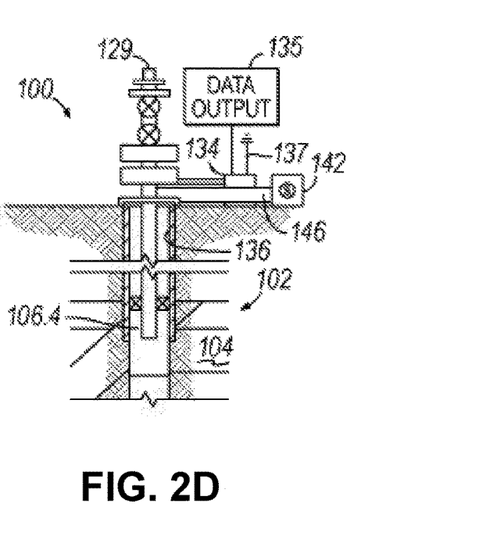

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
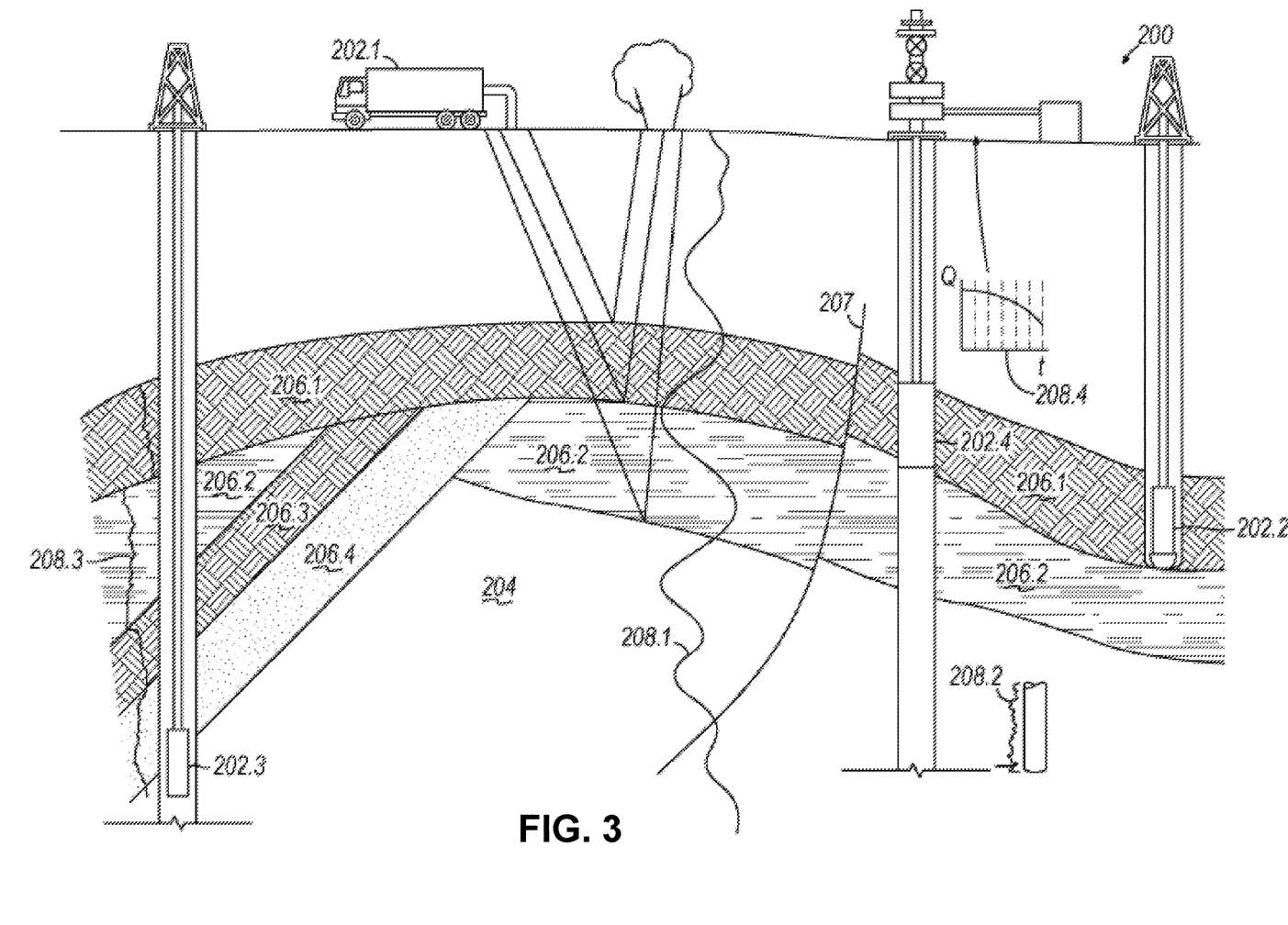
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
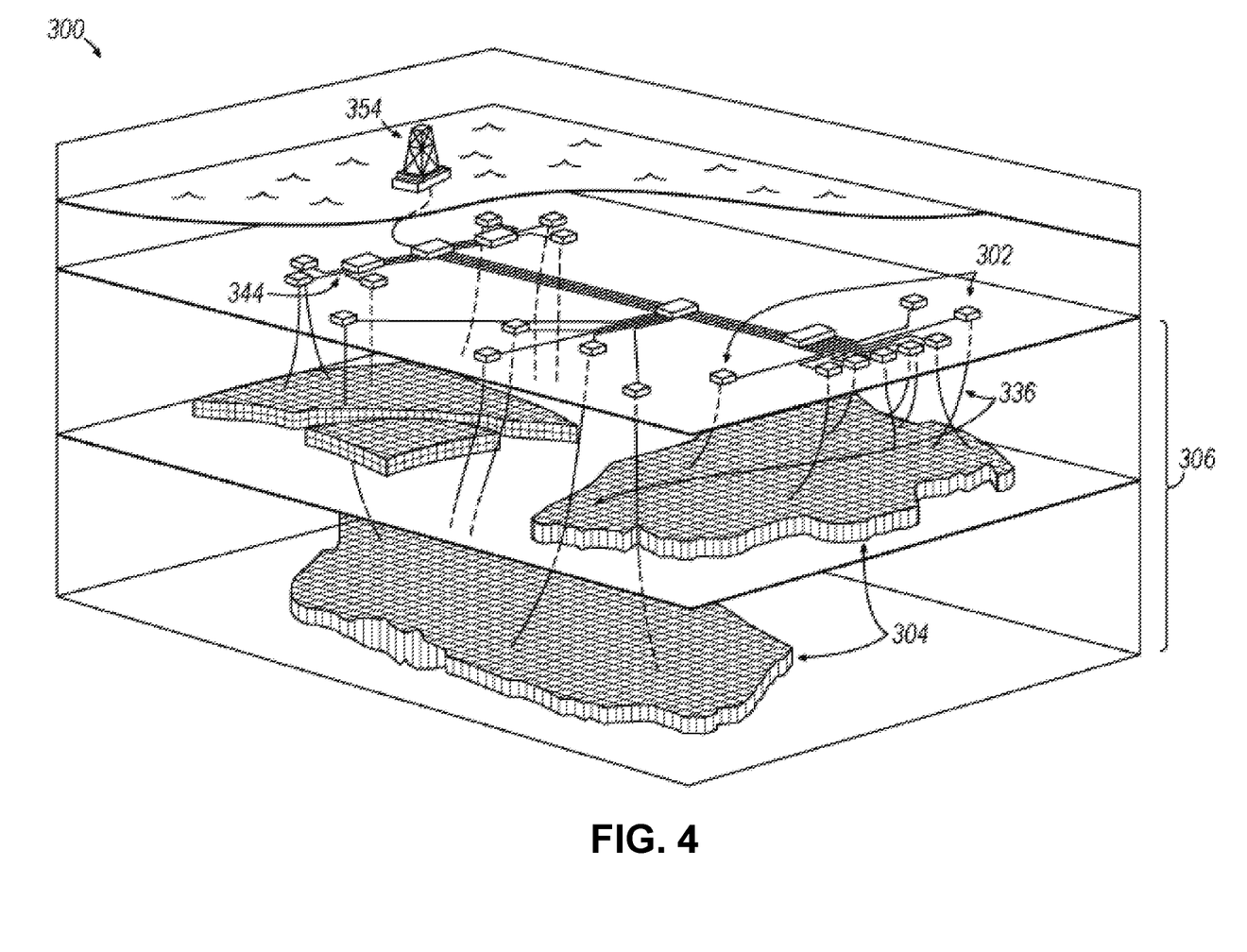
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Probabilistic Area of Interest Identification for Well Placement Planning Under Uncertainty Improving hydrocarbon recovery from green and mature fields through targeting potential drilling generally relies on a computationally complex process of well placement optimization. Because these operational activities are expensive and particularly critical in periods of low oil prices, a risk quantification analysis may also be performed for uncertainty considerations.

One input to many well placement planning processes is a three-dimensional (3D) model of a reservoir, which generally is partitioned into subvolumes referred to as cells that are arranged in regular or irregular grids. Cells are assigned one or more properties, e.g., permeability, porosity, water saturation, oil saturation, water contact, net to gross, residual oil saturation, connate water saturation, oil saturation, pressure, etc. to represent various characteristics of the volumes of a reservoir represented by such cells. Given that each cell represents a volume in a reservoir, smaller cells can provide finer resolution than larger cells, but at the cost of greater numbers of cells being required to cover the same reservoir volume, and consequently, greater computational resources to perform calculations when running simulations.

The properties stored in the cells of a reservoir model may be determined using various technologies, including seismic surveys and well logs. Seismic surveys generally cover larger regions but at a much lower resolution and greater uncertainty, while well logs generally cover smaller regions in the vicinity of actual wells that are drilled into a reservoir but with much higher resolution and less uncertainty in those smaller regions. For many reservoirs, however, the number of existing wells may be very small, and as a result the well log data may cover only a small portion of a reservoir. Various techniques, however, may be used to predict properties in regions between existing wells using the data collected by the well logs, albeit at the cost of greater uncertainty in those regions.

In order to account for such uncertainties, different techniques may be used to generate reservoir models for a given reservoir. For example, many geostatistical approaches, e.g., various stochastic-based techniques, may assign distributions of property values to cells in a reservoir model and generate multiple different reservoir models to represent a given reservoir. As a result, a given reservoir or subsurface region may be modeled with multiple reservoir models. These multiple reservoir models are also generally referred to as multiple "realizations" of a reservoir model to effectively represent the fact that the realizations all attempt to model substantially the same subsurface volume.

Selection of a location and/or trajectory of a well to optimize recovery is dependent upon the accuracy of the reservoir model used in the selection process. As a result, selection from among different reservoir model realizations for a reservoir can impact the ultimate successfulness of a well design.

One factor in particular that may be affected by the selection of a reservoir model realization is the selection of an area of interest (AOI) for candidate wells. The area of interest represents a region in a reservoir that is considered to have a higher likelihood of containing recoverable hydrocarbons, and thus, is considered to be a worthwhile candidate for placing a well. Given that different reservoir model realizations may include different property values or property value distributions for the cells representing a particular volume of a reservoir, what appears to be an area of interest in one realization may not be considered an area of interest in another realization.

Embodiments consistent with the invention may be used to facilitate well placement planning through the use of a probabilistic combination of reservoir model realizations to identify one or more areas of interest in a reservoir and thereby better focus the search space within which candidate wells may be evaluated. As will become more apparent below, some embodiments consistent with the invention may utilize an automated probabilistic workflow that optimizes well placement using probability maps based on reservoir and simulation opportunity indexes. This probability map approach may be used in some embodiments to effectively unify existing reservoir model realizations into a single or combined probability map by establishing thresholds for selected physical parameters and reservoir characteristics. The opportunity indexes may be efficient for identifying zones with high potential for production from oil or gas reservoirs.

As will also become more apparent below, the workflow described herein is generic and may be applied in various embodiments to oil and gas in both mature and green fields as a computationally efficient method of well placement optimization under uncertainty, and may be used for vertical, horizontal and/or deviated wells.

In some embodiments, for example, the workflow may start from a set of reservoir model realizations, and a pattern recognition algorithm, e.g., using various machine learning or artificial intelligence techniques, may be applied to classify and/or rank the realizations. A representative subset of these realizations may then be used in an ensemble-based method to calibrate the realizations to existing observed data. Reservoir and simulation opportunity indexes may then be applied to the calibrated realizations, and thereafter a combined or single probability map may be created to unify the opportunity index maps. Then, based on the pattern observed in the probability map, one or more areas of interest (AOIs) may be outlined, and several realizations of well configurations may be generated. The designed wells may then be screened based on engineering criteria and assessed using numerical simulations on each realization.

The workflow in such embodiments may then terminate by results analysis and well design selection. The workflow thus in some embodiments may consider not only the improvement in oil recovery (or any other performance metric such as net present value (NPV)), but also a measure of risk coming from the uncertainty assessment.

Figure 5:
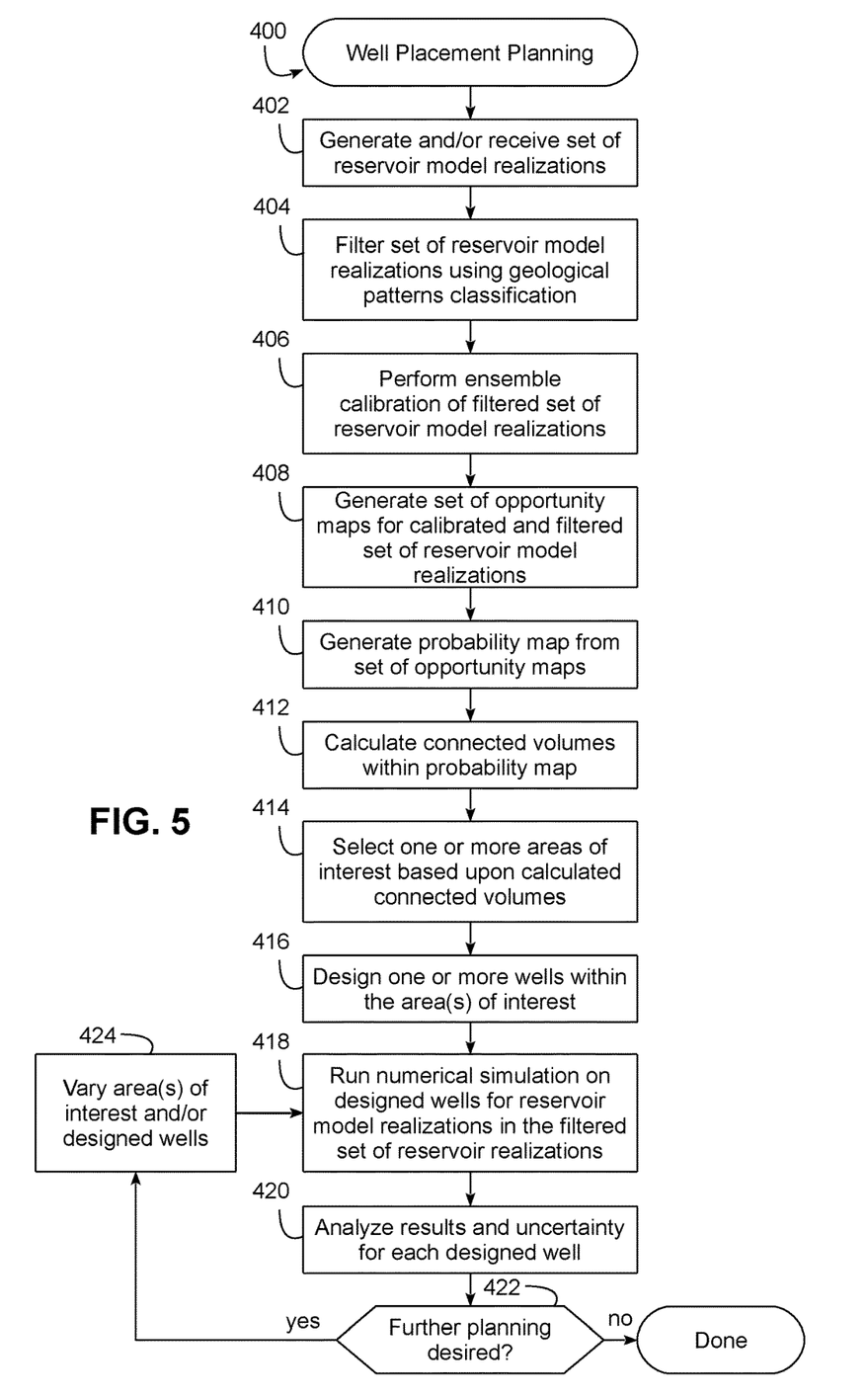
FIG. 5 is a flowchart illustrating an example sequence of operations for performing well placement planning using the data processing system of FIG. 1.

Now turning to FIG. 5, an example well placement planning workflow 400 in accordance with implementations of various technologies and techniques described herein is illustrated, to perform well placement planning in the presence of multiple realizations of a geological model of a reservoir.

Workflow 400 may be used to automate the process of placing new wells in a reservoir and/or sidetracking or recompleting existing wells. Workflow 400 may be implemented, for example, at least in part within petro-technical module 32 of FIG. 1. In addition, in some embodiments, workflow 400 may be implemented as, or otherwise access an optimization engine. Module 32 may also access one or more reservoir simulators (e.g., resident in E&P platform 34) for use in accessing one or more reservoir model realizations. It will be appreciated by those of ordinary skill in the art having the benefit of the instant disclosure that some operations in workflow 400 may be combined, split, reordered, omitted, and/or supplemented with other techniques known in the art, and therefore, the invention is not limited to the particular workflow illustrated in FIG. 5. Moreover, various operations performed in workflow 400 may be fully automated and independent of operator input, while other operations may be partially automated and performed with the guidance and/or input of an operator, e.g., in terms of setting one or more input parameters or thresholds, initiating execution of an operation by a data processing system, making intermediate decisions that alter the workflow, etc. Still other operations may be manually performed by an operator, e.g., with the assistance or guidance of feedback provided by a data processing system. The degree in which workflow 400 may operate independent of operator involvement, feedback and/or input may therefore vary between different embodiments.

Referring again to FIG. 5, workflow 400 may begin in block 402 by generating and/or receiving a set of reservoir model realizations. The reservoir model realizations each represent substantially the same subsurface volume, and the reservoir model realizations may be generated using the same technique, e.g., a geostatistical technique, and may in some instances may vary based upon different input data (e.g., different well logs) and/or different input parameters (e.g., thresholds). In other embodiments, multiple techniques may be used to generate different realizations. Practically any technique suitable for generating reservoir model realizations may be used in various embodiments, e.g., geostatistical techniques, stochastic techniques, object modeling, sequential indicator simulation, truncated Gaussian simulation, multipoint simulation, etc. The invention is therefore not limited to the particular manner in which the reservoir model realizations are generated. It will also be appreciated that each reservoir model realization will generally include a regular or irregular grid of cells representing subvolumes of a reservoir, and that each cell may include one or more properties or parameters representative of the corresponding subvolume.

Next, in block 404, the set of reservoir model realizations are filtered or screened to reduce the number of reservoir model realizations to a subset of reservoir model realizations. In some embodiments, for example, image analysis, e.g., pattern recognition, may be performed on the set of reservoir model realizations to identify one or more groups of redundant reservoir model realizations based upon geological patterns classification. Realizations may be considered to be redundant in some embodiments if they contain similar geological patterns, and as such, pattern recognition may be used to identify when two or more realizations are substantially similar to one another.

Thus, for any group of redundant realizations, a representative realization may be selected and the other (non-selected) realizations in the group may be filtered, screened, or otherwise removed from the set of realizations such that the overall number of realizations utilized in the subsequent operations will be reduced.

In some embodiments, the image analysis may be performed using a neural network or using other artificial intelligence techniques. Furthermore, the image analysis may be physics-independent, and based only on the numerical similarity between various properties stored in the cells of the realizations. In other embodiments, however, physics-based image analysis or pattern recognition may be performed, and make take into account geophysical relationships between cells, e.g., flow paths or responses defined within the realizations. Regardless of the approach used, it may be generally desirable in some embodiments to maintain a similar degree of heterogeneity in the set of reservoir model realizations before and after screening.

Other manners of identifying and screening out redundant reservoir model realizations may be used in the alternative. Therefore the invention is not limited to the particular techniques described herein.

Next, in block 406, each of the remaining reservoir model realizations in the filtered set may be calibrated. The calibration may be used to adjust properties in the realizations to better match observed data. As such, history matching, e.g., using ensemble-based history matching, may be performed in some embodiments. Various approaches may be used in different embodiments, e.g., a Kalman filter, ensemble smoother, ensemble randomized maximum likelihood, simplex optimizer, neural network, evolution strategy, genetic algorithm, etc.

Next, in block 408, a set of opportunity maps may be generated for the reservoir model realizations in the filtered and calibrated set of realizations. Each opportunity map corresponds to a particular reservoir model realization and includes a plurality of entries corresponding to respective cells in the corresponding reservoir model realization. As such, each opportunity map is generally arranged into a three dimensional array. Each entry of an opportunity map stores an opportunity value, e.g., an opportunity index, that is representative of the recovery and storage potential for the respective cell in the reservoir model realization, and may be based upon at least a portion of the properties stored in the cell.

In some embodiments, an opportunity value may be based upon both simulation and reservoir opportunities, and may represent the relative quality of the cell in terms of the opportunity to recover oil from the cell.

The simulation opportunity, for example, may be represented as the combination of a flow capacity, mobile oil saturation, and oil pore volume, as follows:

$$\text{Flow capacity} = k*H*\text{NTG} \tag{1}$$

$$\text{Mobile Oil Saturation} = S_{OIL} - S_{OR} \tag{2}$$

$$\text{Oil Pore Volume} = \text{Mobile Oil Saturation}*\phi*H*\text{NTG} \tag{3}$$

$$\text{Simulation Opportunity} = ((1)*(2)*(3))^{(1/3)} \tag{4}$$

where k is permeability, H is cell height, NTG is net to gross, $S_{OIL}$ is oil phase saturation, $S_{OR}$ is critical or residual oil saturation, and $\phi$ is porosity.

The reservoir opportunity may be represented as the combination of oil pore volume with reservoir quality and pressure gradient, as follows:

$$\text{Reservoir Quality} = 0.0314*(k/\phi)^{0.5} \tag{5}$$

$$\text{Pressure Gradient} = P - P_{initial}$$

$$\text{Reservoir Opportunity} = ((3)*(5)*(6))^{(1/3)} \quad (6)$$

where P is actual reservoir pressure and $P_{initial}$ is initial reservoir pressure.

In some embodiments, the above equations may be combined and simplified into an opportunity value (OV) as follows:

$$OV = 0.315483 * NTG * H * (S_{OIL} - S_{OR}) * (k*\phi)^{0.5} * (P - P_{initial})^{(1/3)} \quad (7)$$

The opportunity value may also be scaled to various ranges, e.g., between 0 and 1. In addition, if the reservoir model realizations are for a green field with no history, the pressure gradient factor may be omitted or scaled. Further, in other embodiments the opportunity value calculations may be adjusted for different hydrocarbon systems (e.g. oil or gas). Other factors may also be considered in the determination of an opportunity value, so the invention is not limited to the particular calculations described herein.

Next, in block 410, a single or combined probability map is generated from the opportunity maps corresponding to the set of reservoir models using a probabilistic approach. The combined probability map includes a plurality of entries corresponding to respective entries in each of the opportunity maps. As such, the combined probability map generally is structured as a three dimensional array having the same dimensions as the opportunity maps. Each entry in the combined probability map has a probability value stored therein that is calculated to be representative of a probability of the opportunity values stored in the respective entries in the opportunity maps meeting an opportunity criterion.

The opportunity criterion in some embodiments, for example, may be based on a threshold such that the probability value stored in an entry is based on the probability of the opportunity values in the respective entries in the opportunity maps meeting the threshold. For example, in some embodiments where the opportunity values are scaled to be between 0 and 1, the threshold may be a value between 0 and 1, and the probability value may be based on the ratio of the number of opportunity values that meet this threshold to the number of opportunity values. Thus, for example, if the threshold is set to 0.5 and there are 100 realizations and corresponding opportunity maps, if 74 of the 100 corresponding entries in the opportunity maps for a given entry in the combined probability map are above the 0.5 threshold, the probability value for the given entry would be 74/100, or 74%.

It will be appreciated that other manners of combining the opportunity values to generate a probability value may be used in other embodiments, so the invention is not limited to the particular approach described herein. Furthermore, as will become more apparent below, it may be desirable in some embodiments to generate different probability maps corresponding to different thresholds or other opportunity criteria for use in identifying areas of interest. For example, probability maps may be generated iteratively in the course of a study in some embodiments.

Once a probability map has been determined, the probability map may be used to identify one or more areas of interest in the subsurface volume or reservoir, e.g., by accessing the combined probability map to identify one or more areas of interest in the subsurface volume based upon the probability values stored in the entries of the combined probability map. In some embodiments, the areas of interest may be identified based upon regions of individual probability values having the highest probability values, or at least having higher probability values than those of neighboring regions. In other embodiments, however, potential well trajectories may also be taken into account by attempting to calculate connected volumes in the probability map, as represented in block 412.

For example, where a well placement plan is for vertical wells, block 412 may combine the entries in the vertical columns in the probability map (e.g., by summing the probability values stored therein). Where a well placement plan is for deviated or horizontal wells, various combinations of adjacent entries defining connected volumes corresponding to various well trajectories may be made to represent different potential horizontal well trajectories through the reservoir.

Thus, in block 414, one or more areas of interest may be identified based upon the calculated connected volumes. In the case of vertical wells, for example, the N vertical columns having the highest summed probability values may be identified as the areas of interest. In the case of deviated or horizontal wells, the N connected volumes having the highest summed probability values may be identified as the areas of interest.

Next, in block 416, one or more wells may be designed within the identified area(s) of interest to generate a well placement plan, e.g., using an automated process that extends well trajectories to and along the connected volumes corresponding to the area(s) of interest. Then, in block 418, numerical simulation may be executed on the one or more designed wells. In some embodiments, the numerical simulation may be executed in each of the filtered and calibrated reservoir model realizations from which the opportunity maps were calculated.

Then, in block 420, the results of the numerical simulation may be analyzed for both performance and uncertainty. The analysis may consider both improvement in oil recovery and a measure of risk from the uncertainty assessment. The performance in some embodiments may be based on production and/or net present value in some embodiments (e.g., based upon an average of the results across the different realizations), and the measure of risk may be based on variations between the results across the different realizations (e.g., based on a standard deviation).

Next, in block 422, if it is determined that further planning or analysis is desired, control passes to block 424 to vary one or both of the area(s) of interest and the designed wells, and then back to block 418 for further analysis in the manner discussed above. In some embodiments, for example, the area(s) of interest could be varied by either selecting one or more different areas of interest from the combined probability map, or by generating a new combined probability map using a different opportunity criterion. The designed wells could be varied by designing different wells either in the prior or in different areas of interest.

Once it is determined in block 422 that no further planning is desired, workflow 400 is complete. The result of workflow 400 is a well placement plan having one or more wells along with an analysis of performance and uncertainty.

Figure 6:
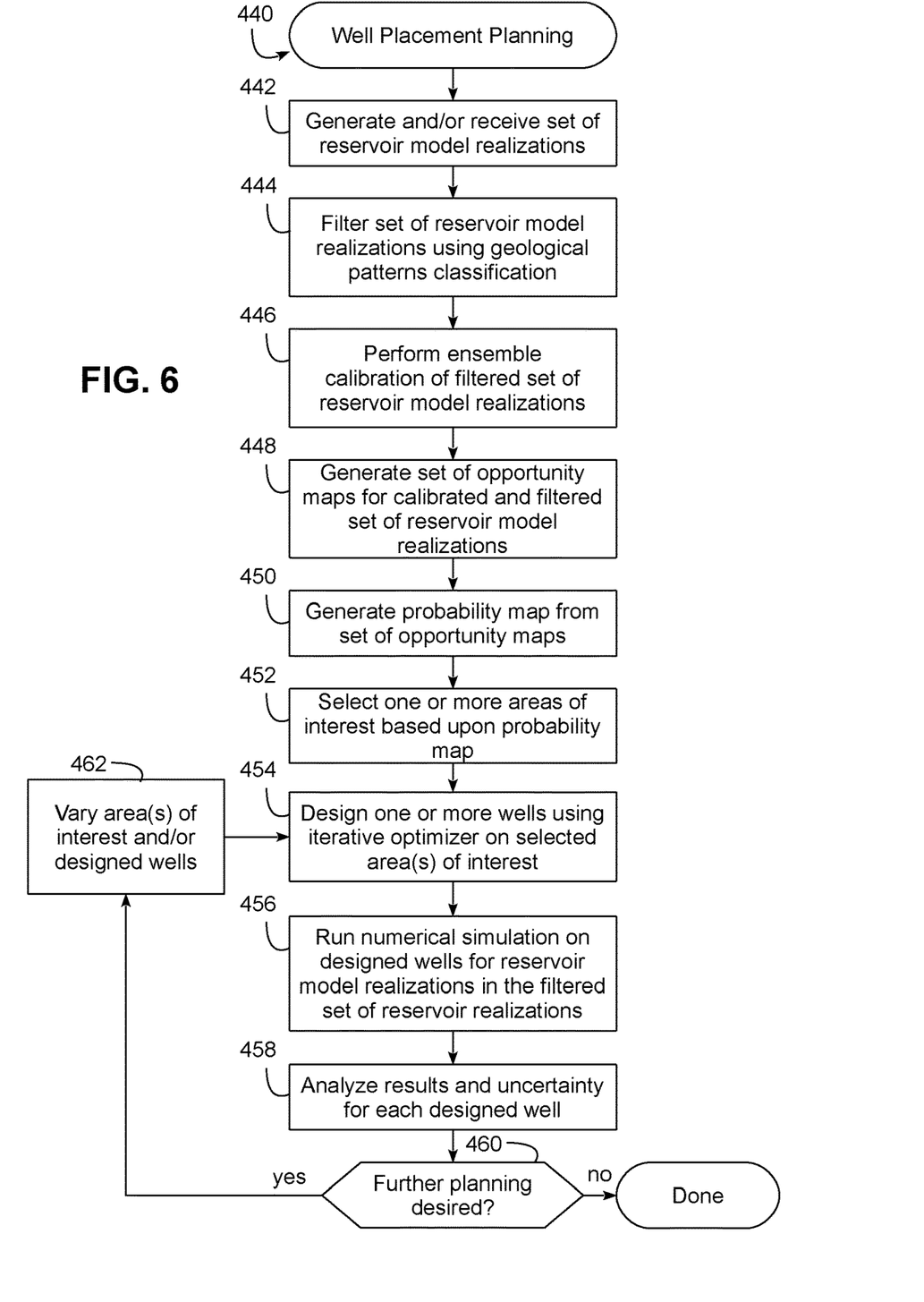
FIG. 6 is a flowchart illustrating another example sequence of operations for performing well placement planning using the data processing system of FIG. 1.

Now turning to FIG. 6, as noted above, in some embodiments the identification of one or more areas of interest using the herein-described techniques may be used as an input to an iterative well placement optimizer. Thus, as illustrated by workflow 440 in FIG. 6, blocks 442-450 may generate a probability map in a similar manner to blocks 402-410 of FIG. 5. In addition, while connected volumes may be used in some embodiments to assist in the identification of areas of interest, in workflow 440 no connected volumes are used, and block 452 selects one or more areas of interest based on the individual probability values in the probability map.

Block 454 next generates a well placement plan including one or more wells by executing an iterative well placement optimizer that is restricted or otherwise initialized using the one or more areas of interest. By doing so, convergence of the iterative well placement optimizer is accelerated, resulting in fewer iterations and thus lower computer resource consumption and greater computational efficiency. Further, where the reservoir model realizations are field-level realizations or otherwise cover large regions, identification of areas of interest may in some embodiments enable iterative optimization to be performed in situations where such optimization could not otherwise be realistically performed.

Blocks 456-462 may thereafter analyze and iteratively modify the well placement plan in a similar manner to blocks 418-424 of FIG. 5. As a result, an iterative well placement optimizer may be supplemented by the probabilistic approach described herein.

Moreover, it will be appreciated that identification of areas of interest from a set of reservoir model realizations may be performed in some embodiments without having to run simulations on the realizations, thereby providing a fast and computationally efficient approach to identifying areas of interest in a reservoir.

The aforementioned techniques have many applications in the field of development planning context. For example, in some embodiments, multiple field development planning scenarios can be rapidly screened, and may be used in connection with selecting new wells, sidetracking existing wells and/or completing existing wells. In brownfields with hundreds of existing wells, infill locations can be quickly identified. Additional applications and uses of the herein-described techniques will be apparent to one of ordinary skill in the art having the benefit of the instant disclosure.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A computer-implemented method for well placement planning, the method comprising:

receiving a set of reservoir model realizations covering a subsurface volume, each reservoir model realization including a plurality of cells representing respective subvolumes of the subsurface volume, each cell in each reservoir model realizations including one or more properties representative of the respective subvolume of the subsurface volume;

generating, for each of the set of reservoir model realizations, a corresponding opportunity map including a plurality of entries corresponding to respective cells in the corresponding reservoir model realization, including, for each entry in the corresponding opportunity map, calculating and storing an opportunity value representative of recovery potential based upon at least a portion of the one or more properties in the respective cell in the corresponding reservoir model realization;

generating a combined probability map from the opportunity maps corresponding to the set of reservoir models, the combined probability map including a plurality of entries corresponding to respective entries in each of the opportunity maps, including, for each entry in the combined probability map, calculating and storing a probability value representative of a probability of the opportunity values stored in the respective entries in the opportunity maps meeting an opportunity criterion;

accessing the combined probability map to identify one or more areas of interest in the subsurface volume based upon the probability values stored in the entries of the combined probability map; and generating a well placement plan that places at least one well in the identified one or more areas of interest.

2. The method of claim 1, further comprising, prior to generating the corresponding opportunity maps, screening the set of reservoir model realizations to reduce redundancies in the set of reservoir model realizations.

3. The method of claim 2, wherein screening the set of reservoir model realizations includes executing image analysis on the set of reservoir model realizations to identify one or more groups of redundant reservoir model realizations.

4. The method of claim 3, wherein screening the set of reservoir model realizations further includes, after executing image analysis:

selecting a representative reservoir model realization for each group of redundant reservoir model realizations; and removing from the set of reservoir model realizations each non-selected reservoir model realization in each group of redundant reservoir model realizations.

5. The method of claim 3, wherein executing image analysis is performed using a neural network.

6. The method of claim 3, wherein executing image analysis includes performing physics-independent pattern recognition on the set of reservoir model realizations.

7. The method of claim 3, wherein executing image analysis includes performing physics-based pattern recognition on the set of reservoir model realizations.

8. The method of claim 1, further comprising, prior to generating the corresponding opportunity maps, calibrating each of the plurality of reservoir model realizations.

9. The method of claim 8, wherein calibrating each of the plurality of reservoir model realizations includes history matching each of the plurality of reservoir model realizations.

10. The method of claim 9, wherein the history matching comprises ensemble-based history matching.

11. The method of claim 10, wherein the history matching includes applying a Kalman filter.

12. The method of claim 1, wherein calculating each opportunity value includes:

calculating a simulation opportunity from at least flow capacity, mobile oil saturation and oil pore volume determined for the respective cell in the corresponding reservoir model realization; and calculating a reservoir opportunity from at least reservoir quality, pressure gradient and oil pore volume determined for the respective cell in the corresponding reservoir model realization.

13. The method of claim 1, wherein calculating each opportunity value is performed using a formula:

$$OV = 0.315483 * NTG * H * (S_{OIL} - S_{OR}) * (k*\phi)^{0.5} * (P - P_{initial})^{(1/3)}$$

where OV is the opportunity value, NTG is net to gross, H is cell height, SOIL is oil phase saturation, SOR is critical or residual oil saturation, k is permeability, $\phi$ is porosity, P is actual reservoir pressure and Pinitial is initial reservoir pressure.

14. The method of claim 1, wherein the opportunity criterion includes a threshold, and wherein the probability value is representative of a probability of the opportunity values stored in the respective entries in the opportunity maps meeting the threshold.

15. The method of claim 14, further comprising:
   generating a plurality of combined probability maps using different thresholds; and
   accessing the plurality of combined probability maps to identify one or more areas of interest in the subsurface volume based upon the probability values stored in the entries of the combined probability maps.

16. The method of claim 1, wherein accessing the combined probability map to identify one or more areas of interest in the subsurface volume based upon the probability values stored in the entries of the combined probability map includes combining entries in the combined probability map based upon potential well trajectories.

17. The method of claim 16, wherein combining entries in the combined probability map based upon potential well trajectories includes combining entries in vertical columns of the combined probability map.

18. The method of claim 1, wherein generating the well placement plan includes executing an iterative well placement optimizer restricted to the identified one or more areas of interest to accelerate convergence of the iterative well placement optimizer.

19. The method of claim 1, wherein generating the well placement plan includes:
   executing numerical simulation on the at least one well in the identified one or more areas of interest; and
   evaluating performance and risk of the at least one well based upon the numerical simulation.

* * * * *